United States Patent
Nishida et al.

(10) Patent No.: US 8,675,609 B2
(45) Date of Patent: Mar. 18, 2014

(54) MOBILE COMMUNICATION METHOD, MOBILITY MANAGEMENT NODE, SERVING GATEWAY APPARATUS, PACKET DATA NETWORK GATEWAY APPARATUS, POLICY CONTROLLER, AND PACKET SWITCH

(75) Inventors: Katsutoshi Nishida, Tokyo (JP); Takashi Morita, Tokyo (JP)

(73) Assignee: NTT DoCoMo, Inc., Tokyo (JP)

(*) Notice: Subject to any disclaimer, the term of this patent is extended or adjusted under 35 U.S.C. 154(b) by 0 days.

(21) Appl. No.: 13/877,755

(22) PCT Filed: Oct. 4, 2011

(86) PCT No.: PCT/JP2011/072853
§ 371 (c)(1),
(2), (4) Date: Jun. 25, 2013

(87) PCT Pub. No.: WO2012/046721
PCT Pub. Date: Apr. 12, 2012

(65) Prior Publication Data
US 2013/0265988 A1  Oct. 10, 2013

(30) Foreign Application Priority Data
Oct. 4, 2010 (JP) .................. 2010-225245

(51) Int. Cl.
*H04W 4/00* (2009.01)
*H04L 12/66* (2006.01)

(52) U.S. Cl.
USPC ........................... 370/331; 370/353; 370/354

(58) Field of Classification Search
USPC .......................... 370/331, 353, 354
See application file for complete search history.

(56) References Cited

U.S. PATENT DOCUMENTS

| 2007/0275724 A1* | 11/2007 | Kikuchi ......................... 455/436 |
| 2009/0262736 A1* | 10/2009 | Zhao et al. ..................... 370/389 |
| 2009/0264131 A1* | 10/2009 | Wu et al. ........................ 455/436 |
| 2011/0110308 A1* | 5/2011 | Liang et al. ................... 370/328 |

OTHER PUBLICATIONS

International Search Report issued in PCT/JP2011/072853 mailed on Nov. 8, 2011 (3 pages).
Written Opinion of the International Searching Authority issued in PCT/JP2011/072853 mailed on Nov. 8, 2011 (3 pages).
3GPP TS 23.401 V9.6.0; "3rd Generation Partnership Project; Technical Specification Group Services and System Aspects; General Packet Radio Service (GPRS) enhancements for Evolved Universal Terrestrial Radio Access Network (E-UTRAN) access (Release 9)"; Sep. 2010 (3 pages).

(Continued)

*Primary Examiner* — Kenny Lin
(74) *Attorney, Agent, or Firm* — Osha Liang LLP

(57) ABSTRACT

A mobile communication system according to the present invention includes the steps of: causing an UE to switch a radio access network in a connection destination from E-UTRAN to UTRAN/GERAN; causing an MME to receive "Delete Bearer Request" to a voice communication packet bearer from an S-GW; and causing the MME to transmit to the S-GW a "Delete Bearer Response" to the "Delete Bearer Request", without giving an instruction to the UE#1 or the E-UTRAN to release the voice communication packet bearer, if a core bearer disconnection flag is set in the received "Delete Bearer Request".

4 Claims, 8 Drawing Sheets

(56) References Cited

OTHER PUBLICATIONS

3GPP TS 23.216 V9.5.0; "3rd Generation Partnership Project; Technical Specification Group Services and System Aspects; Single Radio Voice Call Continuity (SRVCC); Stage 2 (Release 9)"; Sep. 2010 (42 pages).

NTT DOCOMO; "Voice bearer deactivation for SRVCC"; 3GPP TSG SA WG2 Meeting #81, S2-104740; Prague, Czech Republic; Oct. 11-15, 2010 (7 pages).

NTT DOCOMO; "Correction on SRVCC procedure for voice bearer deactivation"; 3GPP TSG SA WG2 Meeting #81, S2-105141; Prague, Czech Republic; Oct. 11-15, 2010 (8 pages).

* cited by examiner

MOBILE COMMUNICATION METHOD, MOBILITY MANAGEMENT NODE, SERVING GATEWAY APPARATUS, PACKET DATA NETWORK GATEWAY APPARATUS, POLICY CONTROLLER, AND PACKET SWITCH

TECHNICAL FIELD

The present invention relates to a mobile communication method, a mobility management node, a serving gateway apparatus, a packet data network gateway apparatus, a policy controller, and a packet switch.

BACKGROUND ART

Conventionally, there has been known a mobile communication system capable of accommodating radio access systems in the 2G/3G schemes (UTRAN: Universal Terrestrial Radio Access Network/GERAN: GSM EDGE Radio Access Network) and a radio access system (E-UTRAN: Evolved Universal Terrestrial Radio Access Network) in an LTE (Long Term Evolution) scheme.

In such mobile communication systems, there has been known a technology that switches a UE (User Equipment, a mobile station) #1 from a state of performing voice communications using a voice communication packet bearer in a PS (Packet Switch, packet switched) domain (state of performing VoIP communications using an INS (IP Multimedia Subsystem, service control network)) to a state of performing voice communications using a circuit-switched bearer in a CS (Circuit Switch, circuit switched) domain, so that the voice communications of the UE#1 can be continued, i.e., "SRVCC (Single Radio Voice Call Continuity)" (see, Non-patent document 1). FIG. 2 shows an operation of switching the voice communications in the mobile communication system.

PRIOR ART DOCUMENT

Patent Document

Non-Patent Document

Non-patent document 1: 3GPP TS23.216

SUMMARY OF THE INVENTION

Here, the operation is that shown in "Fig. 6.2.2.2-1 or Fig. 6.3.2.2-1 in 3GPP TS2.216". In the operation, operations of Step S1006 (S1006a to S1006i) are performed when an MME (Mobility Management Entity, a mobility management node) receives a "Delete Bearer Request" from an S-GW (Serving-Gateway, a serving gateway apparatus) in Step S1005, as shown in FIG. 8, as a procedure to disconnect the voice communication packet bearer in the PS domain after a radio access network in a connection destination of the UE#1 switches to the UTRAN/GERAN (see, Steps 4 to 7 in Fig. 5.4.4.1-1 in 3GPP TS2.401).

However, since the radio access network in a connection destination of the UE#1 has switched to the UTRAN/GERAN in Step S115 shown in FIG. 2, the UE#1 does not receive a "RRC Connection Reconfiguration" transmitted by an eNB (radio base station) in Step S1006b shown in FIG. 8. Accordingly, there is a problem that the operation in Step S1006 becomes error, thus generating unnecessary traffic, and that the operation itself shown in FIG. 2 also becomes an error.

For this reason, the present invention has been made in view of the foregoing problem. Accordingly, an objective of the present invention is to provide a mobile communication method, a mobility management node, a serving gateway apparatus, a packet data network gateway apparatus, a policy controller, and a packet switch which can prevent generation of any unnecessary traffic and appropriately switch voice communications of the UE#1 mentioned above in "SRVCC".

Means for Solving the Problem

A first feature of present invention is a mobile communication method for switching a mobile station from a state of performing voice communications using a voice communication packet bearer via a radio access network in a first communication scheme which does not support a circuit-switched communication and a mobile transmission network accommodating the radio access network in the first communication scheme to a state of performing voice communications using a circuit-switched bearer via a radio access network in a second communication scheme which supports the circuit-switched communication and a core network accommodating the radio access network in the second communication scheme, the mobile communication method including the steps of: causing the mobile station to switch a radio access network in a connection destination from the radio access network in the first communication scheme to the radio access network in the second communication scheme; causing a mobility management node in the mobile transmission network to store predetermined information indicating that switching of the radio access network in the connection destination in the mobile station has been performed; causing the mobility management node to receive a delete bearer request signal to the voice communication packet bearer from a serving gateway apparatus in the mobile transmission network; and causing the mobility management node to transmit to the serving gateway apparatus a delete bearer response signal to the delete bearer request signal, without giving an instruction to the mobile station or the radio access network in the first communication scheme to release the voice communication packet bearer, if the mobility management node stores the predetermined information.

A second feature of the present invention is a mobile communication method for switching a mobile station from a state of performing voice communications using a voice communication packet bearer via a radio access network in a first communication scheme which does not support a circuit-switched communication and a mobile transmission network accommodating the radio access network in the first communication scheme to a state of performing voice communications using a circuit-switched bearer via a radio access network in a second communication scheme which supports the circuit-switched communication and a core network accommodating the radio access network in the second communication scheme, the method including the steps of: causing the mobile station to switch a radio access network in a connection destination from the radio access network of the first communication system to the radio access network in the second communication scheme; causing a serving gateway apparatus in the mobile transmission node to receive a delete bearer request signal to the voice communication packet bearer, from a packet data network gateway apparatus in the mobile transmission node; and causing the serving gateway apparatus to transmit to the packet data network gateway apparatus a delete bearer response signal to the delete bearer request signal without transmitting to a mobility management node in the mobile transmission node the delete bearer request signal to the voice communication packet bearer, if a predetermined flag is set in the received delete bearer request signal.

A third feature of the present invention is a mobile communication method for switching a mobile station from a state of performing voice communications using a voice communication packet bearer via a radio access network in a first communication scheme which does not support a circuit-switched communication and a mobile transmission network accommodating the radio access network in the first communication scheme to a state of performing voice communications using a circuit-switched bearer via a radio access network in a second communication scheme which supports the circuit-switched communication and a core network accommodating the radio access network in the second communication scheme, the method including the steps of: causing the mobile station to switch a radio access network in a connection destination from the radio access network in the first communication scheme to the radio access network in the second communication scheme; causing a serving gateway apparatus of the mobile transmission node to receive a delete bearer request signal to the voice communication packet bearer, from a policy controller in the mobile transmission node; and causing the serving gateway apparatus not to transmit to a mobility management node in the mobile transmission node a delete bearer request signal to the voice communication packet bearer, if a predetermined flag is set in the received delete bearer request signal.

A fourth feature of the present invention is a mobile communication method for switching a mobile station from a state of performing voice communications using a voice communication packet bearer via a radio access network in a first communication scheme which does not support a circuit-switched communication and a mobile transmission network accommodating the radio access network in the first communication scheme to a state of performing voice communications using a circuit-switched bearer via a radio access network in a second communication scheme which supports the circuit-switched communication and a core network accommodating the radio access network in the second communication scheme, the method including the steps of: causing the mobile station to switch a radio access network in a connection destination from the radio access network in the first communication scheme to the radio access network in the second communication scheme; causing a mobility management node of the mobile transmission node to store predetermined information indicating that switching of the radio access network in a connection destination has been performed at the mobile station; causing the mobility management node to receive a delete bearer request signal to the voice communication packet bearer, from a serving gateway apparatus in the mobile transmission node; and causing the mobility management node to transmit to the serving gateway apparatus a delete bearer response signal to the delete bearer request signal, without giving an instruction to the mobile station or the radio access network in the first communication scheme to release the voice communication packet bearer, if the mobility management node stores the predetermined information.

A five feature of the present invention is a mobile communication method for switching a mobile station from a state of performing voice communications using a voice communication packet bearer in a packet switched domain to a state of performing voice communications using a circuit-switched bearer in a circuit switched domain, the method including the steps of: causing the mobile station to switch a domain for performing voice communications from the packet switched domain to the circuit switched domain; causing a packet switch in the packet switched domain to receive a delete bearer request signal to the voice communication packet bearer from a serving gateway apparatus in the packet switched domain; and causing the packet switch to transmit to the serving gateway apparatus a delete bearer response signal to the delete bearer request signal, without giving an instruction to the mobile station to release the voice communication packet bearer, if a predetermined flag is set in the received delete bearer request signal.

A sixth feature of the present invention is a mobile communication method for switching a mobile station from a state of performing voice communications using a voice communication packet bearer in a packet switched domain to a state of performing voice communications using a circuit-switched bearer in a circuit switched domain, the method including the steps of: causing the mobile station to switch a domain for performing voice communications from the packet switched domain to the circuit switched domain; causing a serving gateway apparatus in the packet switched domain to receive a delete bearer request signal to the voice communication packet bearer from a packet data network gateway apparatus in the packet switched domain; and causing the serving gateway apparatus to transmit to the packet data network gateway apparatus a delete bearer response signal to the delete bearer request signal, without transmitting to a packet switch in the packet switched domain a delete bearer request signal to the voice communication packet bearer, if a predetermined flag is set in the received delete bearer request signal.

A seventh feature of the present invention is a mobile communication method for switching a mobile station from a state of performing voice communications using a voice communication packet bearer in a packet switched domain to a state of performing voice communications using a circuit-switched bearer in a circuit switched domain, the method including the steps of: causing the mobile station to switch a domain for performing voice communications from the packet switched domain to the circuit switched domain; causing a serving gateway apparatus in the packet switched domain to receive a delete bearer request signal to the voice communication packet bearer from a policy controller in the packet switched domain; and a step of causing the serving gateway apparatus not to transmit to a packet switch in the packet switched domain a delete bearer request signal to the voice communication packet bearer, if a predetermined flag is set in the received delete bearer request signal.

An eighth feature of the present invention is a mobile communication method for switching a mobile station from a state of performing voice communications using a voice communication packet bearer in a packet switched domain to a state of performing voice communications using a circuit-switched bearer in a circuit switched domain, the method including the steps of: causing the mobile station to switch a domain for performing voice communications from the packet switched domain to the circuit switched domain; causing a packet switch in the packet switched domain to store predetermined information indicating that switching of the domain for performing the voice communications in the mobile station has been performed; causing the packet switch to receive a delete bearer request signal to the voice communication packet bearer from a serving gateway apparatus in the packet switched domain; and causing the packet switch to transmit to the serving gateway apparatus a delete bearer response signal to the delete bearer request signal, without giving an instruction to the mobile station to release the voice communication packet bearer, if the packet switch stores the predetermined information.

A ninth feature of the present invention is a mobility management node provided in a mobile transmission node in a mobile communication system configured so that a mobile station can be switched from a state of performing voice communications using a voice communication packet bearer via a radio access network in a first communication scheme which does not support a circuit-switched communication and the mobile transmission network accommodating the radio access network in the first communication scheme to a state of performing voice communications using a circuit-switched bearer via a radio access network in a second communication scheme which supports the circuit-switched communication and a core network accommodating the radio access network in the second communication scheme, in which the mobility management node is configured to receive a delete bearer request signal to the voice communication packet bearer from a serving gateway apparatus in the mobile transmission node after the mobile station switches a radio access network in a connection destination from the radio access network in the first communication scheme to the radio access network in the second communication scheme, and the mobility management node is configured to transmit to the serving gateway apparatus a delete bearer response signal to the delete bearer request signal, without giving an instruction to the mobile station or the radio access network in the first communication scheme to release the voice communication packet bearer, if a predetermined flag is set in the received delete bearer request signal.

A tenth feature of the present invention is a serving gateway apparatus provided in a mobile transmission node in a mobile communication system configured so that a mobile station can be switched from a state of performing voice communications using a voice communication packet bearer via a radio access network in a first communication scheme which does not support a circuit-switched communication and a mobile transmission network accommodating the radio access network in the first communication scheme to a state of performing voice communications using a circuit-switched bearer via a radio access network in a second communication scheme which supports the circuit-switched communication and a core network accommodating a radio access network in a second communication scheme, in which the serving gateway apparatus is configured to receive a delete bearer request signal to the voice communication packet bearer from a packet data network gateway apparatus in the mobile transmission node after the mobile station switches a radio access network in a connection destination from the radio access network in the first communication scheme to the radio access network in the second communication scheme, and the serving gateway apparatus is configured to transmit to the packet data network gateway apparatus a delete bearer response signal to the delete bearer request signal, without transmitting to a mobility management node in the mobile transmission node a delete bearer request signal to the voice communication packet bearer, if a predetermined flag is set in the received delete bearer request signal.

An eleventh feature of the present invention is a serving gateway apparatus provided in a mobile transmission node in a mobile communication system configured so that a mobile station can be switched from a state of performing voice communications using a voice communication packet bearer via a radio access network in a first communication scheme which does not support a circuit-switched communication and a mobile transmission network accommodating the radio access network in the first communication scheme to a state of performing voice communications using a circuit-switched bearer via a radio access network in a second communication scheme which supports the circuit-switched communication and a core network accommodating the radio access network in the second communication scheme, in which the serving gateway apparatus is configured to receive a delete bearer request signal to the voice communication packet bearer from a policy controller in the mobile transmission node after the mobile station switches a radio access network in a connection destination from the radio access network in the first communication scheme to the radio access network in the second communication scheme, and the serving gateway apparatus is configured not to transmit to a mobility management node in the mobile transmission node a delete bearer request signal to the voice communication packet bearer, if a predetermined flag is set in the received delete bearer request signal.

A twelfth feature of the present invention is a packet data network gateway apparatus provided in a mobile transmission node in a mobile communication system configured so that a mobile station can be switched from a state of performing voice communications using a voice communication packet bearer via a radio access network in a first communication scheme which does not support a circuit-switched communication and a mobile transmission network accommodating the radio access network in the first communication scheme to a state of performing voice communications using a circuit-switched bearer via a radio access network in a second communication scheme which supports the circuit-switched communication and a core network accommodating the radio access network in the second communication scheme, wherein the packet data network gateway apparatus is configured to set a predetermined flag in a delete bearer request signal to the voice communication packet bearer to transmit it to a mobility management node in the mobile transmission node after the mobile station switches a radio access network in a connection destination from the radio access network in the first communication scheme to the radio access network in the second communication scheme.

A thirteenth feature of the present invention is a policy controller provided in a mobile transmission node in a mobile communication system configured so that a mobile station can be switched from a state of performing voice communications using a voice communication packet bearer via a radio access network in a first communication scheme which does not support a circuit-switched communication and a mobile transmission network accommodating the radio access network in the first communication scheme to a state of performing voice communications using a circuit-switched bearer via a radio access network in a second communication scheme which supports the circuit-switched communication and a core network accommodating the radio access network in the second communication scheme, wherein the policy controller is configured to set a predetermined flag in a delete bearer request signal to the voice communication packet bearer to transmit it to a mobility management node in the mobile transmission node, after the mobile station switches a radio access network in a connection destination from the radio access network in the first communication scheme to the radio access network in the second communication scheme.

A fourteenth feature of the present invention is a mobility management node provided in a mobile transmission node in a mobile communication system configured so that a mobile station can be switched from a state of performing voice communications using a voice communication packet bearer via a radio access network in a first communication scheme which does not support a circuit-switched communication and a mobile transmission network accommodating the radio access network in the first communication scheme to a state of performing voice communications using a circuit-switched bearer via a radio access network in a second communication scheme which supports the circuit-switched communication and a core network accommodating the radio access network in the second communication scheme, wherein the mobility management node is configured to store predetermined information indicating that switching of a radio access network in a connection destination in the mobile station has been performed, after the mobile station switches the radio access network in a connection destination from the radio access network in the first communication scheme to the radio access network in the second communication scheme, and the mobility management node is configured to transmit to a serving gateway apparatus a delete bearer response signal to a delete bearer request signal, without giving an instruction to the mobile station or the radio access network in the first communication scheme to release the voice communication packet bearer, if the mobility management node stores the predetermined information when receiving the delete bearer request signal to the voice communication packet bearer from the serving gateway apparatus in the mobile transmission node.

A fifteenth feature of the present invention is a packet switch provided in a packet switched domain in a mobile communication system configured so that a mobile station can be switched from a state of performing voice communications using a voice communication packet bearer in the packet switched domain to a state of performing voice communications using a circuit-switched bearer in a circuit switched domain, wherein the packet switch is configured to receive a delete bearer request signal to the voice communication packet bearer from a serving gateway apparatus in the packet switched domain, after the mobile station switches a domain for performing voice communications from the packet switched domain to the circuit switched domain, and the packet switch is configured to transmit to the serving gateway apparatus a delete bearer response signal to the delete bearer request signal, without giving an instruction to the mobile station to release the voice communication packet bearer, if a predetermined flag is set in the received delete bearer request signal.

A sixteenth feature of the present invention is a serving gateway apparatus provided in a packet switched domain in a mobile communication system configured so that a mobile station can be switched from a state of performing voice communications using a voice communication packet bearer in the packet switched domain to a state of performing voice communications using a circuit-switched bearer in a circuit switched domain, wherein the serving gateway apparatus is configured to receive a delete bearer request signal to the voice communication packet bearer from a packet data network gateway apparatus in the packet switched domain, after the mobile station switches a domain for performing voice communications from the packet switched domain to the circuit switched domain, and the serving gateway apparatus is configured to transmit to the packet data network gateway apparatus a delete bearer response signal to the delete bearer request signal, without transmitting to a packet switch in the packet switched domain a delete bearer request signal to the voice communication packet bearer, if a predetermined flag is set in the received delete bearer request signal.

A seventeenth feature of the present invention is a serving gateway apparatus provided in a packet switched domain in a mobile communication system configured so that a mobile station can be switched from a state of performing voice communications using a voice communication packet bearer in the packet switched domain to state of performing voice communications using a circuit-switched bearer in a circuit switched domain, wherein the serving gateway apparatus is configured to receive a delete bearer request signal to the voice communication packet bearer from a policy controller in the packet switched domain after the mobile station switches a domain for performing voice communications from the packet switched domain to the circuit switched domain, and the serving gateway apparatus is configured not to transmit to a packet switch in the packet switched domain a delete bearer request signal to the voice communication packet bearer, if a predetermined flag is set in the received delete bearer request signal.

An eighteenth feature of the present invention is a packet data network gateway apparatus provided in a packet switched domain in a mobile communication system configured so that a mobile station can be switched from a state of performing voice communications using a voice communication packet bearer in the packet switched domain to a state of performing voice communications using a circuit-switched bearer in a circuit switched domain, wherein the packet data network gateway apparatus is configured to set a predetermined flag to a delete bearer request signal to the voice communication packet bearer to transmit it to a packet switch in the packet switched domain, after the mobile station switches a domain for performing voice communications from the packet switched domain to the circuit switched domain.

A nineteenth feature of the present invention is a policy controller provided in a packet switched domain in a mobile communication system configured so that a mobile station can be switched from a state of performing voice communications using a voice communication packet bearer in the packet switched domain to a state of performing voice communications using a circuit-switched bearer in a circuit switched domain, wherein the policy controller is configured to set a predetermined flag in a delete bearer request signal to the voice communication packet bearer to transmit it to a packet switch in the packet switched domain, after the mobile station switches a domain for performing voice communications from the packet switched domain to the circuit switched domain.

A twentieth feature of the present invention is a packet switch provided in a packet switched domain, in a mobile communication system configured so that a mobile station can be switched from a state of performing voice communications using a voice communication packet bearer in the packet switched domain to a state of performing voice communications using a circuit-switched bearer in a circuit switched domain, wherein the packet switch is configured to store predetermined information indicating that switching of a domain for performing voice communications in the mobile station has been performed, after the mobile station switches the domain for performing voice communications from the packet switched domain to the circuit switched domain, and the packet switch is configured to transmit to a serving gateway apparatus a delete bearer response signal to a delete bearer request signal, without giving an instruction to the mobile station to release the voice communication packet bearer, if the packet switch stores the predetermined information when receiving the delete bearer request signal to the voice communication packet bearer from the serving gateway apparatus in the packet switched domain.

A twenty-first feature of the present invention is a mobility management node configured to transmit to a mobile transmission network a Delete Bearer Instruction signal to a predetermined packet bearer, and configured not to give an instruction to a mobile station or a radio access network to release the predetermined packet bearer, if a predetermined flag is set in a received delete bearer request signal to the predetermined packet bearer.

A twenty-second feature of the present invention is a packet switch configured to transmit to a core network a Delete Bearer Instruction signal to a predetermined packet bearer, and configured not to give an instruction to a mobile station or a radio access network to release the predetermined packet bearer, if a predetermined flag is set in a received delete bearer request signal to the predetermined packet bearer.

Effects of the Invention

As described above, the present invention can provide a mobile communication method, a mobility management node, a serving gateway apparatus, a packet data network gateway apparatus, a policy controller, and a packet switch which can prevent generation of any unnecessary traffic and appropriately switch voice communications of the UE#1 mentioned above in "SRVCC".

MODE FOR CARRYING OUT THE INVENTION (Mobile Communication System According to First Embodiment of the Invention)

Figure 1:
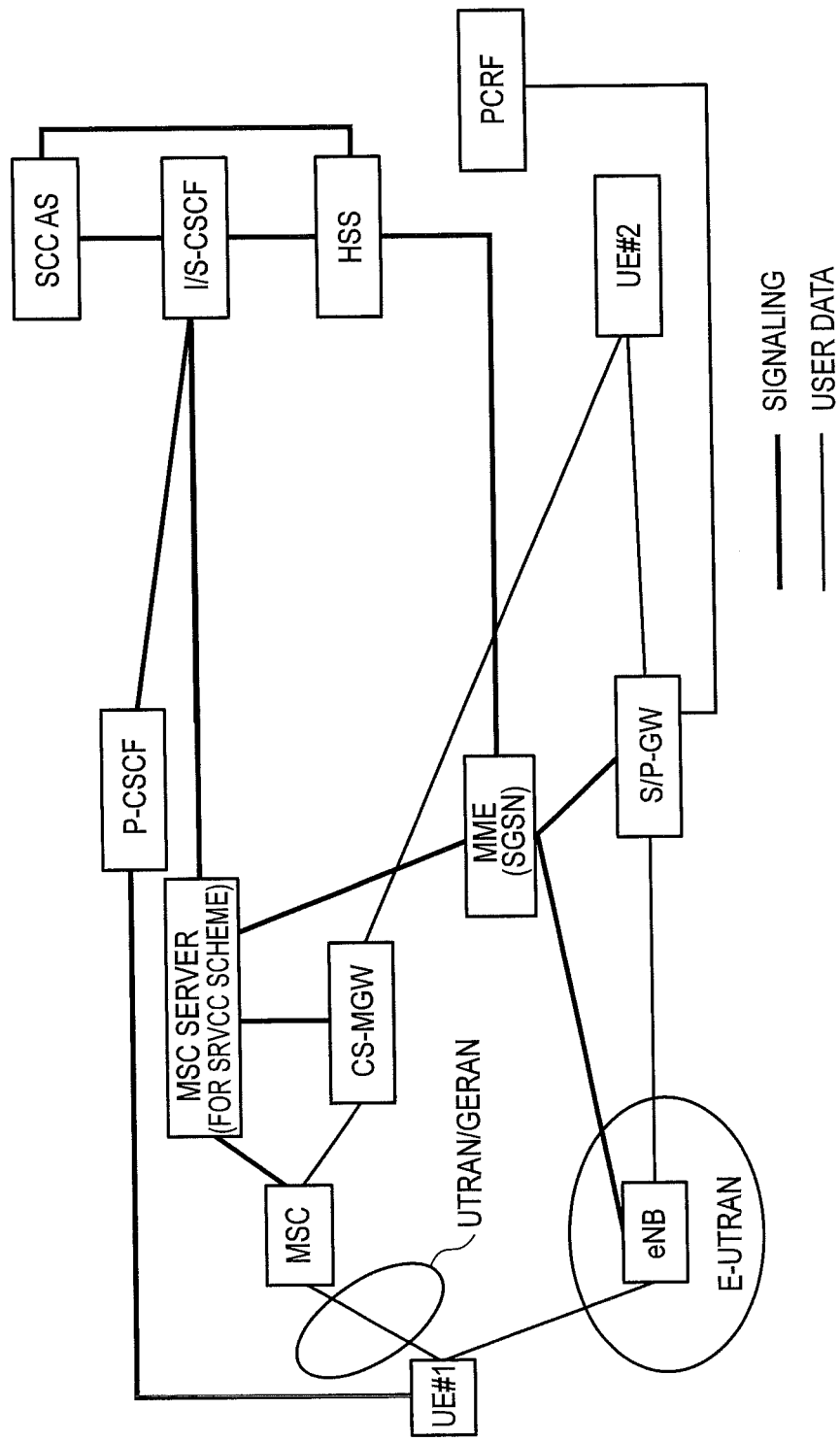
FIG. 1 is an overall configuration diagram of a mobile communication system according to a first embodiment of the invention.
Figure 2:
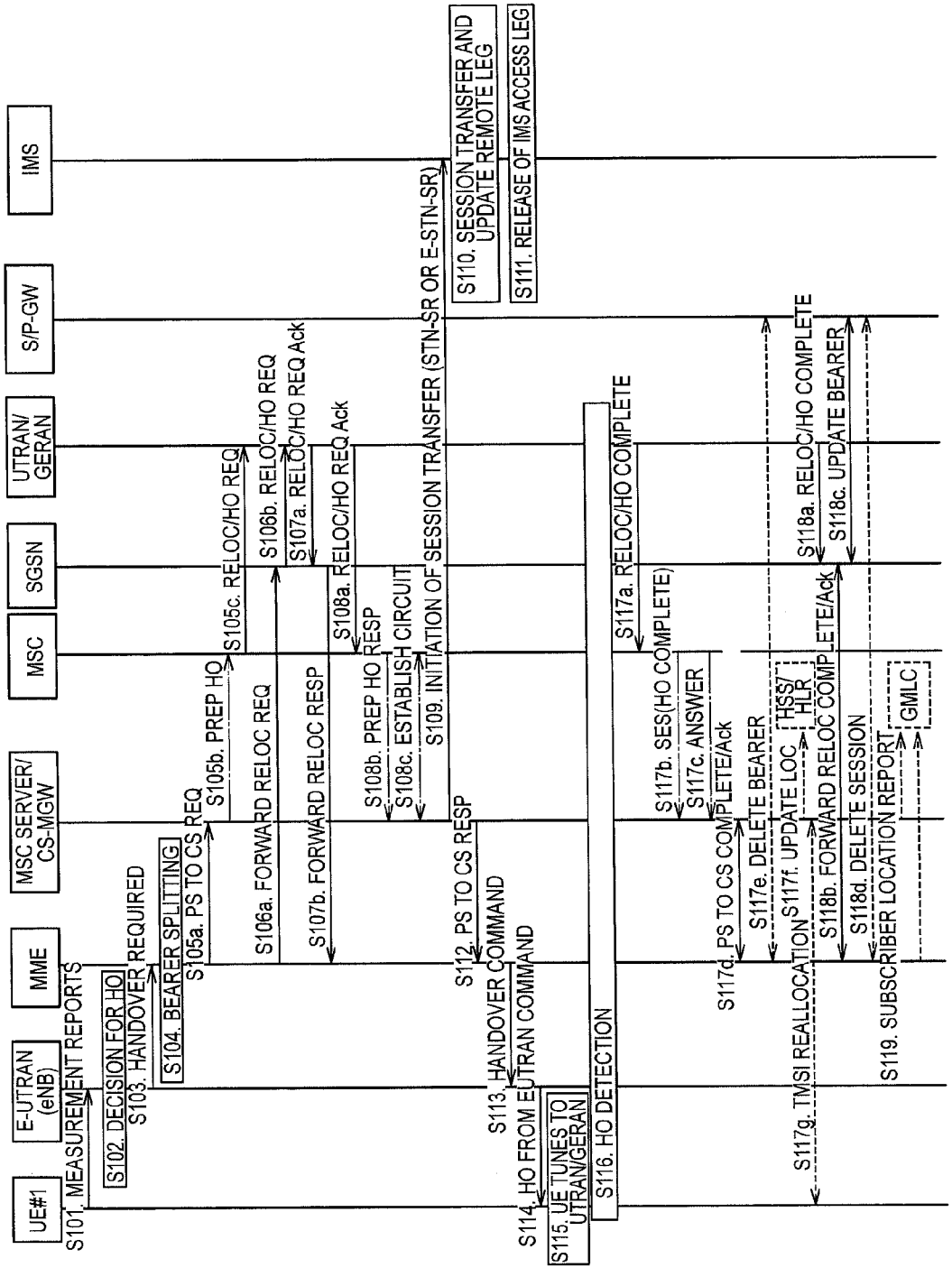
FIG. 2 is a sequential diagram illustrating an operation of the mobile communication system according to the first embodiment of the invention.
Figure 3:
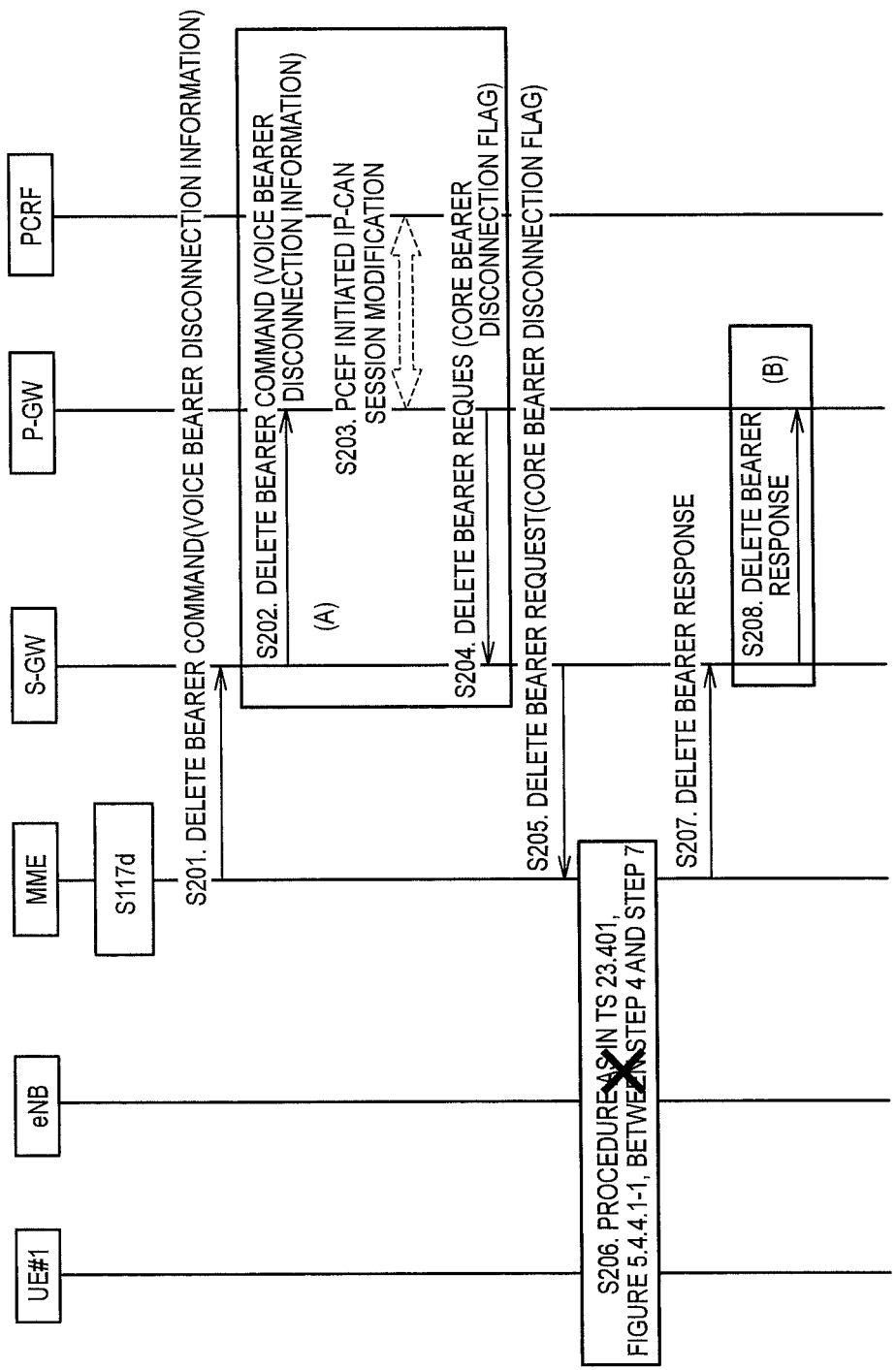
FIG. 3 is a sequential diagram illustrating an operation of the mobile communication system according to the first embodiment of the invention.

Referring to FIG. 1 to FIG. 3, a mobile communication system according to a first embodiment of the invention is described.

As shown in FIG. 1, a mobile communication system according to the present embodiment includes an EPS (Evolved Packet System) having E-UTRAN and a mobile transmission network, a 2G/3G scheme system having GERAN/UTRAN and a 2G/3G scheme core network, and an IMS.

In the E-UTRAN, an eNodeB is deployed, and in the GERAN/UTRAN, a NodeB/BSS (radio station) and a RNC (radio network control station) are deployed.

In the mobile transmission network, there are deployed an MME, an S-GW, a P-GW (PDN-Gateway, a packet data network gateway apparatus), a PCRF (Policy and Charging Rules Function, a policy controller), an HSS (Home Subscriber Server, a subscriber management server)/HLR (Home Location Register) (unillustrated).

In the 2G/3G scheme core network, there are deployed an MSC (Mobile-service Switching Center, a circuit switch), an SGSN (Serving GPRS Support Node, a packet switch), an MSC server for the SRVCC scheme, and a CS-MGW (Circuit Switch-Media Gateway, a media gateway apparatus for a circuit switch).

In the IMS, there are deployed an SCC AS (Service Centralization and Continuity Application Server), an I/S-CSCF (Interrogating/Serving Call Session Control Function), a P-CSCF (Proxy Call Session Control Function) and the like.

Also, the mobile communication system according to the embodiment is configured so that the UE#1 can be switched from a state of performing voice communications using a voice communication packet bearer via the E-UTRAN (a radio access network in a first communication scheme which does not support a circuit-switched communication) and the mobile transmission network accommodating the E-UTRAN to a state of performing voice communications using a circuit-switched bearer via the UTRAN/GERAN (a radio access network in a second communication scheme which supports the circuit-switched communication) and the core network accommodating the UTRAN/GERAN, whereby "SRVCC" is achieved.

Hereinafter, referring to FIGS. 2 and 3, an operation of the mobile communication system according to the embodiment is specifically described.

It is assumed herein that the UE#1 is in a state of performing voice communications using a voice communication packet bearer via E-UTRAN and a mobile transmission network. In addition, in the mobile communication system according to the embodiment, it is assumed that a GTP (GPRS Tunneling Protocol) is used between an S-GW and a P-GW.

As shown in FIG. 2, at Step S101, the UE#1 transmits "Measurement Report" to an eNB in the E-UTRAN.

At Step S102, the eNB determines that a radio access network of the UE#1 in a connection destination is switched from the E-UTRAN to the UTRAN/GERAN.

At Step S103, the eNB transmits "Handover Required" to the MME.

At Step S104, the MME performs "Bearer Splitting" and at Step S105a, transmits "PS to CS Req" to the MSC server/CS-MGW.

At Step S105b, the MSC server/CS-MGW transmits "Prep HO" to the MSC, and at Step S105c, the MSC transmits "Reloc/HO Req" to the UTRAN/GERAN.

In addition, at Step S106a, the MME transmits "Forward Reloc Req" to the SGSN, and at Step S106b, SGSN transmits "Reloc/HO Req" to the UTRAN/GERAN. Here, it is assumed that a context for a packet bearer other than the voice communication packet bearer mentioned above is notified from the MME to the SGSN.

At Step S107a, the UTRAN/GERAN transmits "Reloc/HO Req Ack" to the SGSN, and at Step S107b, the SGSN transmits "Forward Reloc Resp" to the MME.

At Step S108a, the UTRAN/GERAN transmits "Reloc/HO Req Ack" to the MSC, and at Step S108b, the MSC transmits "Prep HO Resp" to the MSC server/CS-MGS, and at Step S108c, a circuit is established between the MSC server/CS-MGW and the MSC.

At Step S109, the MSC server/CS-MGW transmits "Initiation of Session Transfer (STN-SR or E-STN-SR)" to the SCC AS in the IMS, and at steps S110 and S111, the SCC AS performs processing shown in FIG. 2.

At Step S112, the MSC server/CS-MGW transmits "PS to CS Resp" to the MME.

At Step S113, the MME transmits "Handover Command" to the eNB, and at Step S114, the eNB transmits "HO from EUTRAN command" to the UE#1.

At Step S115, the UE#1 switches the radio access network in the connection destination from the E-UTRAN to the UTRAN/GERAN.

At Step S116, the processing of switching the radio access network in the connection destination in the UE#1 from the E-UTRAN to the UTRAN/GERAN is performed in the eNB, the NodeB/BSS, the RNC, and the like.

At Step S117a, the UTRAN/GERAN transmits "Reloc/HO Complete" to the MSC, and at Step S117b, the MSC transmits "SES (HO Complete)" to the MSC server/CS-MGW, and at Step S117c, transmits "ANSWER."

At Step S117d, the "PS to CS Complete/Ack" is transmitted/received between the MSC server/CS-MGW and the MME.

At Step S117e, "Delete Session (bearer deletion processing)" is performed. Here, referring to FIG. 3, the "Delete bearer" is described in detail.

As shown in FIG. 3, when Step S117d completes, at Step S201, the MME transmits a "Delete Bearer Command" containing voice bearer disconnection information to the S-GW.

At Step S202, the S-GW transmits the "Delete Bearer Command" containing the voice bearer disconnection information to the P-GW, and at Step S203, "PCEF Initiated IP-CAN Session Modification" is performed between the P-GW and the PCRF, and at Step S204, the P-GW transmits a "Delete Bearer Request" containing a core bearer disconnection flag to the S-GW.

Note that the P-GW may also notify the PCRF of the voice bearer disconnection information, determine whether or not the PCRF which received the voice bearer disconnection information should set the core bearer disconnection flag in the "Delete Bearer Request" transmitted from the P-GW to the S-GW, and give the P-GW an instruction on a result of the determination.

At Step S205, the S-GW transmits the "Delete Bearer Request" containing the core bearer disconnection flag to the MME.

Here, at Step S206, when the MME detects that the core bearer disconnection flag is set in the received "Delete Bearer Request", the MME transmits to the S-GW a "Delete Bearer Response" indicating that deletion of the target bearer (the voice communication packet bearer mentioned above) has completed successfully, without instructing the UE#1 to release the voice communication packet bearer mentioned above (specifically, without transmitting to the eNB a "Deactivate Bearer Request" containing a "NAS Deactivate EPS Bearer Context Request message"), at Step S207.

Figure 5:
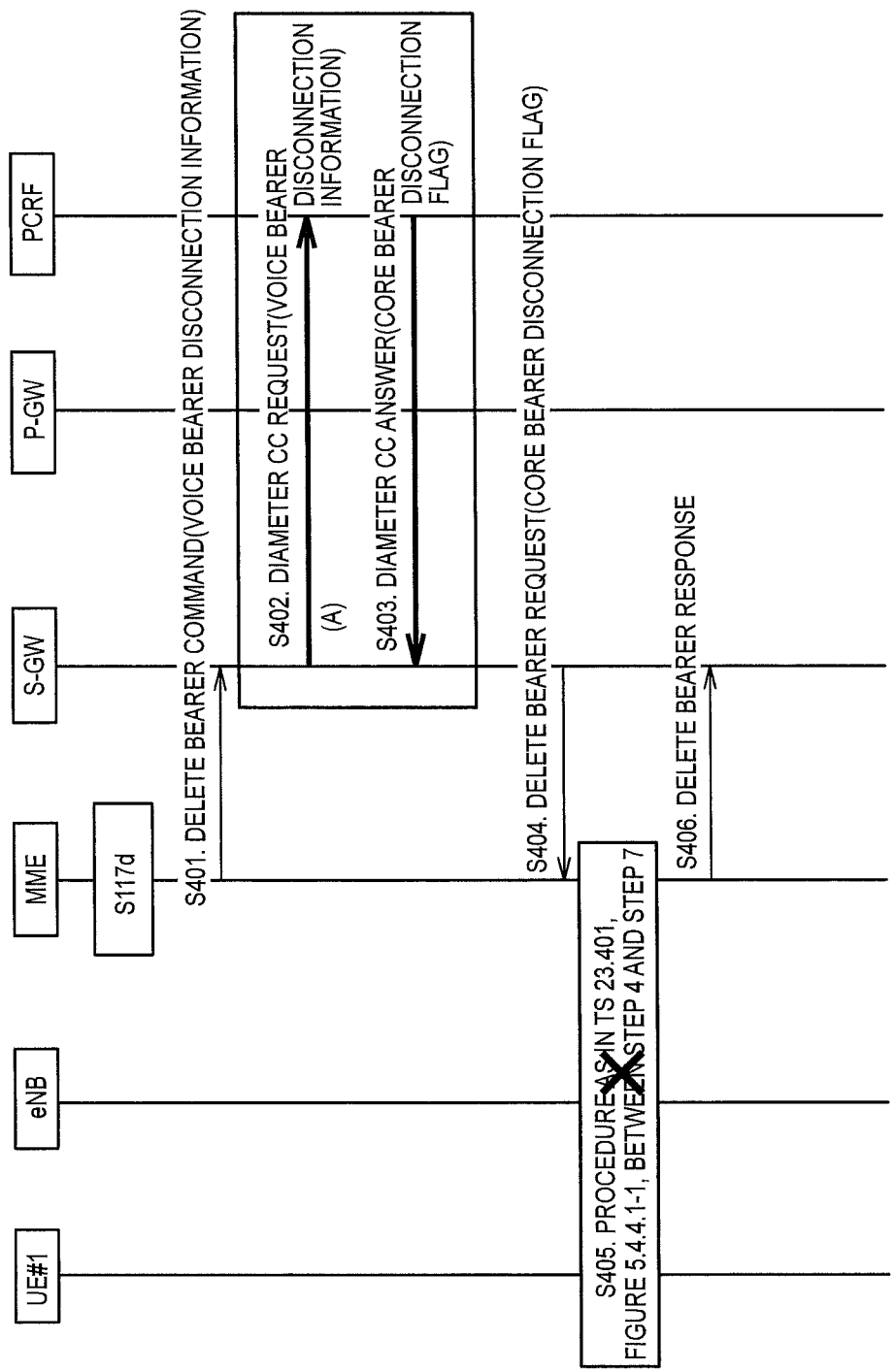
FIG. 5 is a sequential diagram illustrating an operation of the mobile communication system according to the Modification 1 of the invention.

Specifically, at Step S206, when the MME detects that the core bearer disconnection flag is set in the received "Delete Bearer Request", the processing of "steps 4 to 7 in Fig. 5.4.4.1-1 of 3GPP TS23.401" described above is not performed.

In contrast, at Step S206, when the MME detects that that the core bearer disconnection flag is not set in the received "Delete Bearer Request", as with the conventional case, the processing of "steps 4 to 7 in Fig. 5.4.4.1-1 of 3GPP TS23.401" described above is performed.

Note that when the MME receives the "Delete Bearer Request" at Step S205, it may or may not delete the voice communication packet bearer.

At Step S208, the S-GW transmits to the P-GW the "Delete Bearer Response" indicating that deletion of the target bearer (the voice communication packet bearer mentioned above) has completed successfully. Note that the S-GW may append to the "Delete Bearer Response" information indicating that only the voice communication packet bearer in the core network is disconnected.

Returning to FIG. 2, at Step S117f, the MSC server/CS-MGW transmits "UpdateLoc" to the HSS/HLR.

At Step S117g, a "TMSI Reallocation" is performed between the UE#1 and the USC server/CS-MGW.

At Step S118a, the UTRAN/GERAN transmits the "Reloc/HO Complete" to the SGSN, and at Step S118b, the "Forward Reloc Complete/Ack" is performed between the MME and SGSN. At Step S118c, "Update bearer (bearer updating processing)" is performed between the SGSN and the S/P-GW, and at Step S118d, the "Delete Session (session deletion processing)" is performed.

At the Step S118a to S118d, the processing of switching any packet bearers other than the voice communication packet bearer mentioned above is performed. Note that through the procedure, the MME releases all packet bearers including the voice communication packet bearer retained in the eNB, by transmitting a "Release Resource" to the eNB (unillustrated).

At Step S119, the MME and the MSC server/CS-MGW transmits a "Subscriber Location Report" to the GMLC.

The mobile communication system according to the embodiment can prevent generation of any unnecessary traffic and appropriately switch voice communications of the UE#1 mentioned above in "SRVCC" since the MME is such configured that when it detects that the core bearer disconnection flag is set in the received "Delete Bearer Request", the processing of "steps 4 to 7 in Fig. 5.4.4.1-1 of 3GPP TS23.401" is not performed.

(Modification 1)

Figure 4:
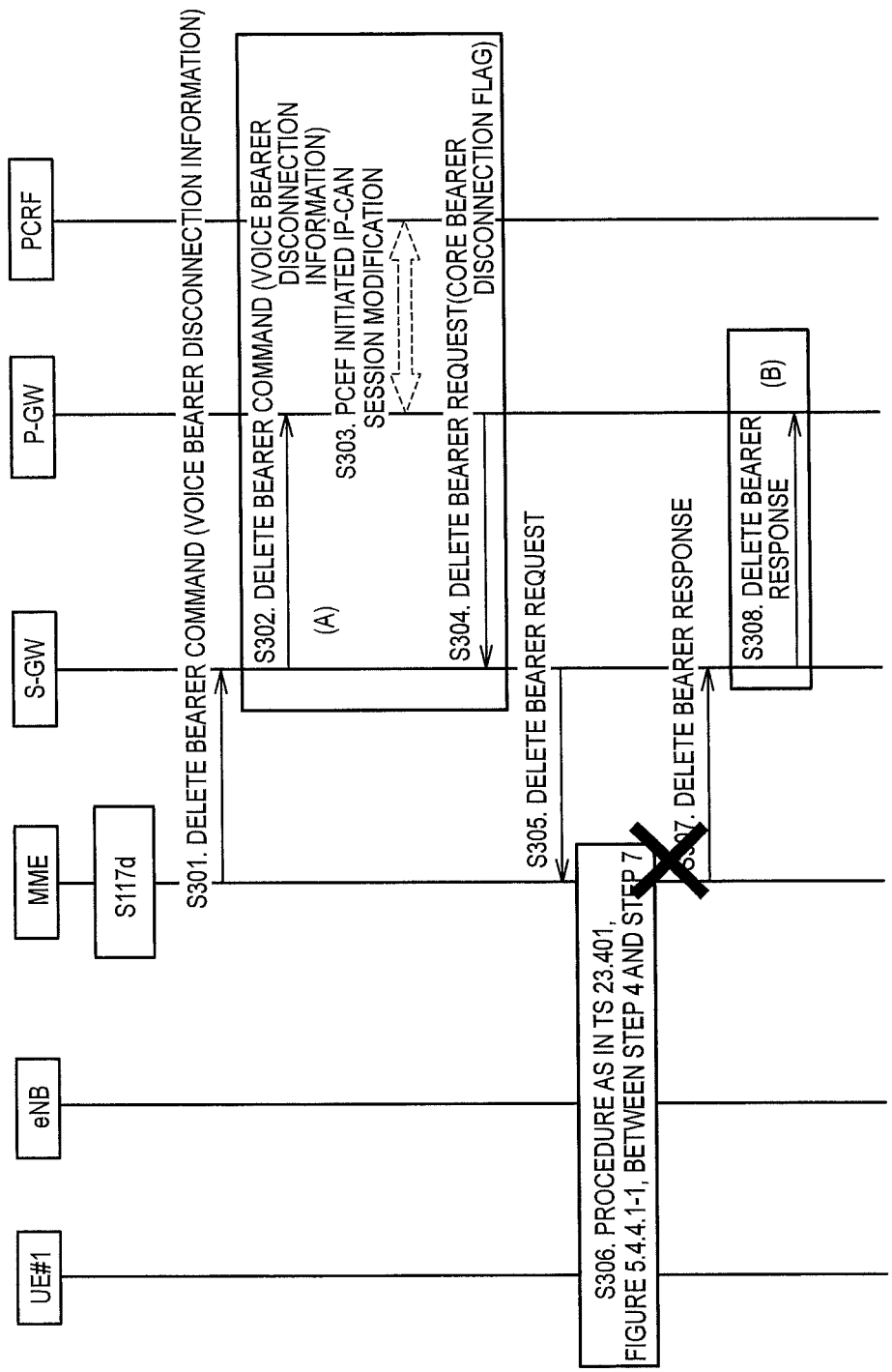
FIG. 4 is a sequential diagram illustrating an operation of the mobile communication system according to Modification 1 of the invention.

Referring to FIG. 4, a mobile communication system according to Modification 1 of the invention is described. Hereinafter, a mobile communication system according to the Modification 1 is described by paying attention to a difference from the mobile communication system according to the first embodiment described above.

As shown in FIG. 4, when step S117d completes, the MME transmits a "Delete Bearer Command" containing voice bearer disconnection information to an S-GW at Step S301.

At Step S302, the S-GW transmits the "Delete Bearer Command" containing voice bearer disconnection information to a P-GW, and at Step S303, a "PCEF Initiated IP-CAN Session Modification" is performed between the P-GW and the PCRF, and at Step S304, the P-GW transmits a "Delete Bearer Request" containing a core bearer disconnection flag to the S-GW.

Here, at Step S305, when the S-GW detects the core bearer disconnection flag is set in the received "Delete Bearer Request", at Step S308, the S-GW transmits to the MME a "Delete Bearer Response" indicating that deletion of the target bearer (the voice communication packet bearer mentioned above) has completed successfully without transmitting the "Delete Bearer Request".

Note that the S-GW may also append to the "Delete Bearer Response" information indicating that only the voice communication packet bearer in a core network is disconnected.

Thus, at Step S305, when the S-GW detects that a core bearer disconnection flag is set in the received "Delete Bearer Request", the processing of "steps 3 to 8 in Fig. 5.4.4.1-1 of 3GPP TS23.401" described above is not performed.

In contrast, at Step S305, when the S-GW detects that the core bearer disconnection flag is not set in the received "Delete Bearer Request", as with a conventional case, the processing of "steps 3 to 8 in Fig. 5.4.4.1-1 of 3GPP TS23.401" described above is performed.

The mobile communication system according to the Modification 1 can prevent generation of any unnecessary traffic and appropriately switch voice communications of the UE#1 mentioned above in "SRVCC" since the S-GW is such configured that when it detects that the core bearer disconnection flag is set in the received "Delete Bearer Request", the processing of "steps 3 to 8 in Fig. 5.4.4.1-1 of 3GPP TS23.401" is not performed.

(Modification 2)

Referring to FIG. 5, a mobile communication system according to Modification 2 of the invention is described. Hereinafter, a mobile communication system according to the Modification 2 is described by paying attention to a difference from the mobile communication system according to the first embodiment described above.

In addition, it is assumed that PMIP (Proxy Mobile IP) is used between an S-GW and a P-GW in the mobile communication system according to the Modification 2.

As shown in FIG. 5, when Step S117*d* completes, at Step S401, an MME transmits a "Delete Bearer Command" containing voice bearer disconnection information to the S-GW.

At Step S402, the S-GW transmits a "Diameter CC Request" containing the voice bearer disconnection information to a PCRF, and at Step S403, the PCRF transmits a "Diameter CC Answer" containing a core bearer disconnection flag to the S-GW.

At Step S404, the S-GW transmits a "Delete Bearer Request" containing the core bearer disconnection flag to the MME.

Here, at Step S405, when the MME detects that the core bearer disconnection flag is set in the received "Delete Bearer Request", at Step S406, the MME transmits to the S-GW a "Delete Bearer Response" indicating that deletion of the target bearer (the voice communication packet bearer mentioned above) has completed successfully, without instructing the UE#1 to release the voice communication packet bearer mentioned above (specifically, without transmitting to the eNB a "Deactivate Bearer Request" containing a "NAS Deactivate EPS Bearer Context Request message").

Specifically, at Step S405, when the MME detects that the core bearer disconnection flag is set in the received "Delete Bearer Request", the processing of "steps 4 to 7 in Fig. 5.4.4.1-1 of 3GPP TS23.401" described above is not performed.

In contrast, at Step S405, when the MME detects that that the core bearer disconnection flag is not set in the received "Delete Bearer Request", as with the conventional case, the processing of "steps 4 to 7 in Fig. 5.4.4.1-1 of 3GPP TS23.401" described above is performed.

Note that when the MME receives the "Delete Bearer Request" at Step S404, it may or may not delete the voice communication packet bearer.

Here, at Step S404, when the S-GW detects that the core bearer disconnection flag is set in the received "Diameter CC Answer", the S-GW may also perform only deletion of a voice communication packet bearer without transmitting the "Delete Bearer Request" to the MME.

(Modification 3)

Figure 6:
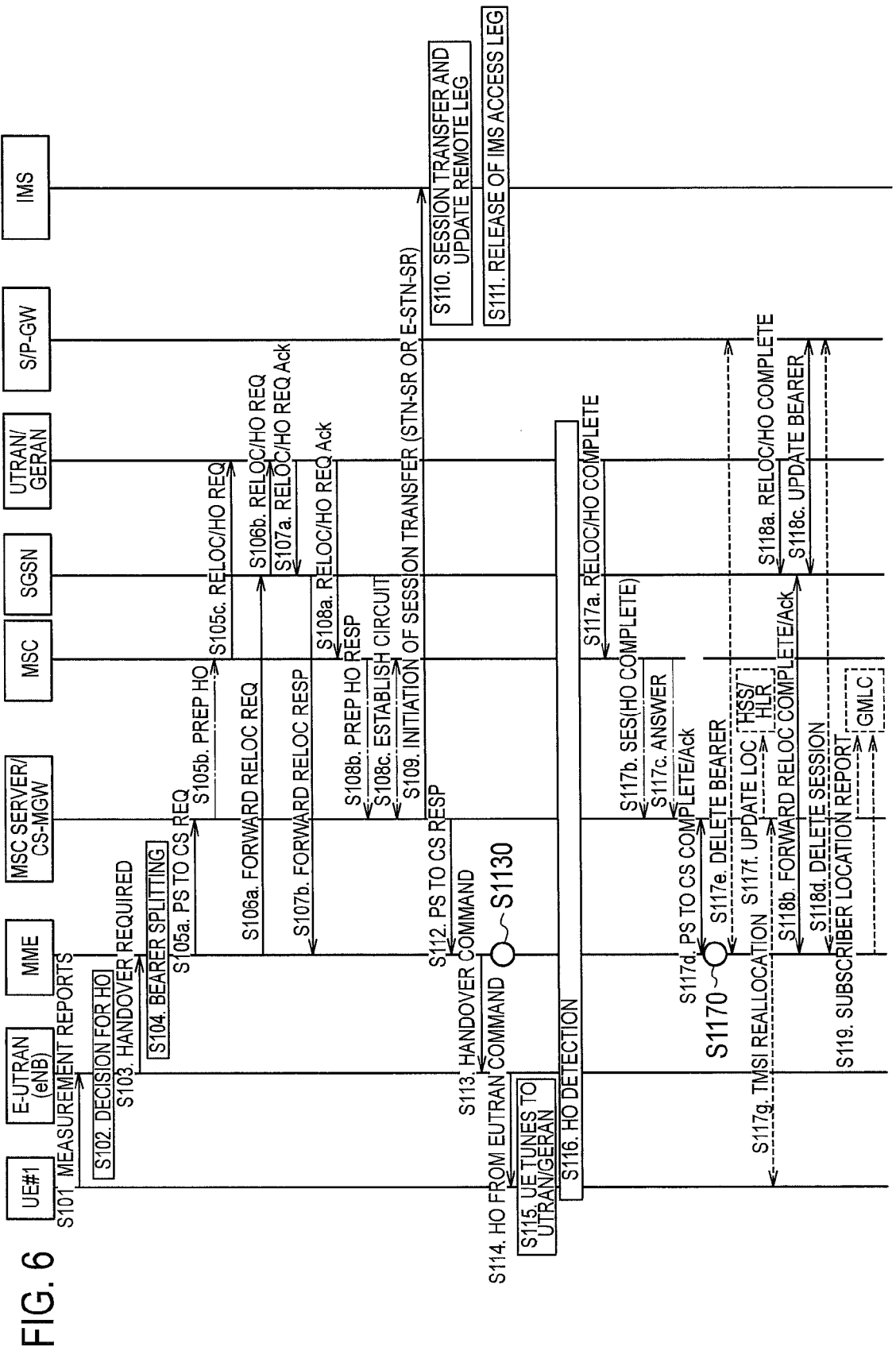
FIG. 6 is a sequential diagram illustrating an operation of the mobile communication system according to Modification 2 of the invention.
Figure 7:
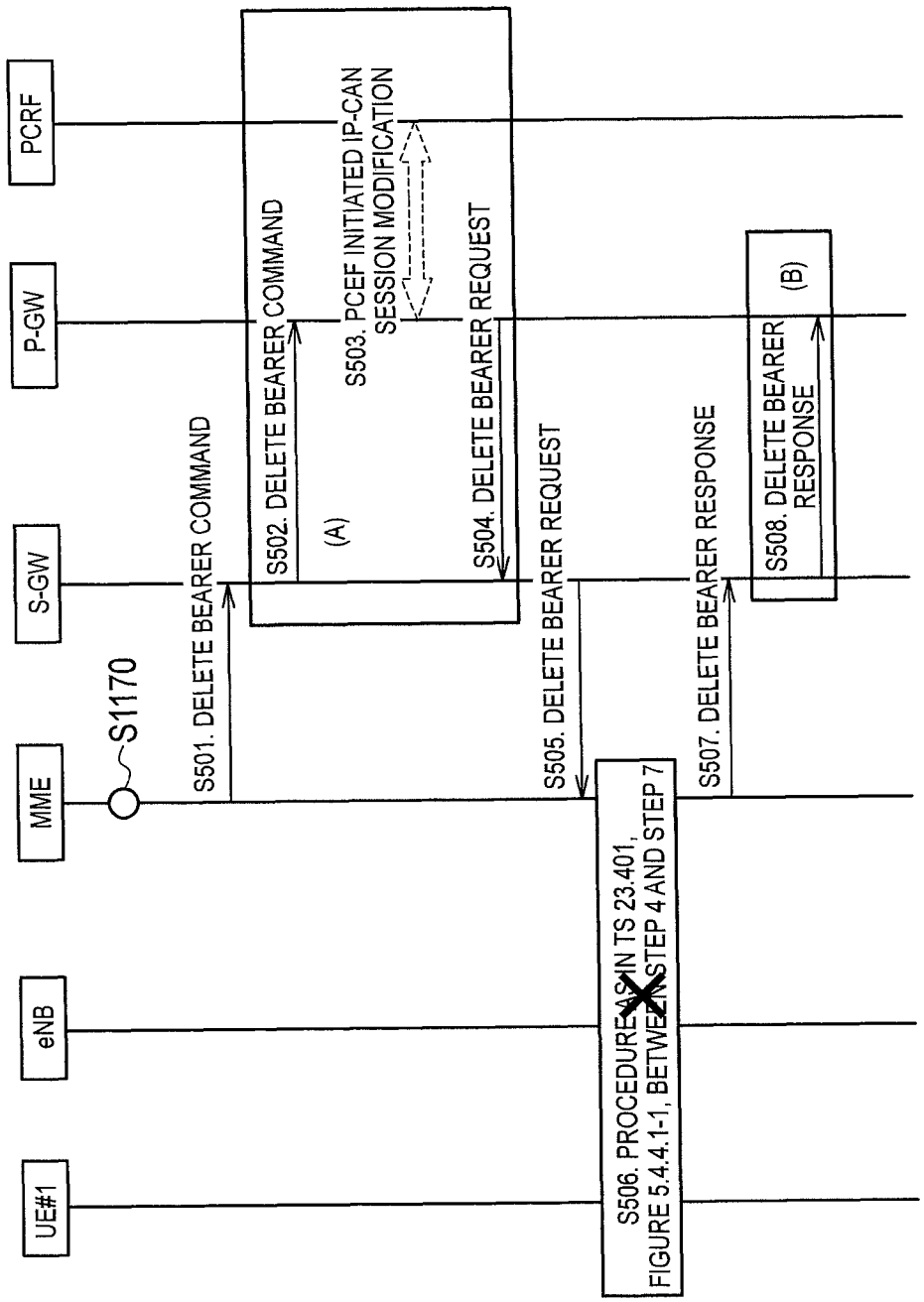
FIG. 7 is a sequential diagram illustrating an operation of the mobile communication system according to the Modification 2 of the invention.
Figure 8:
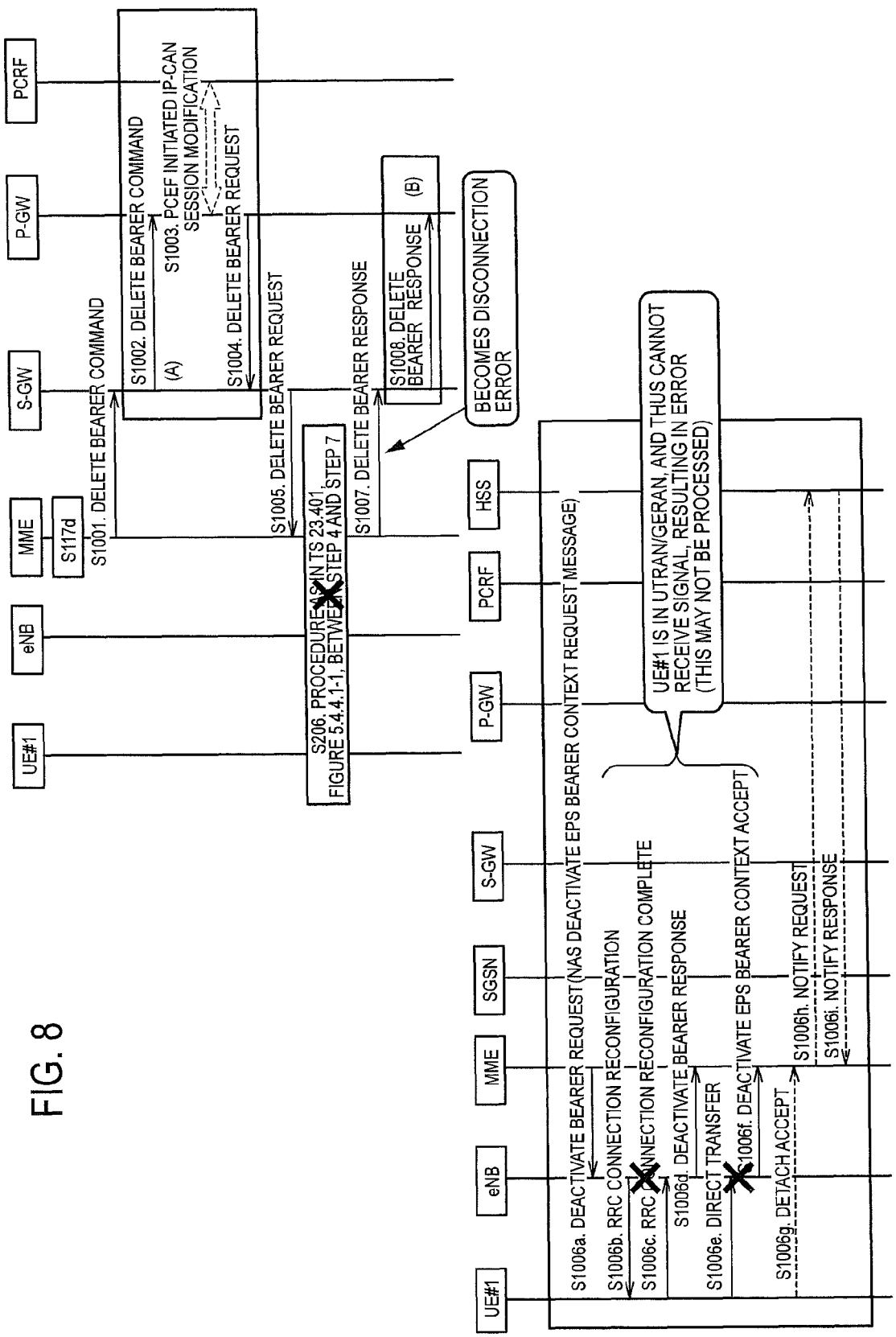
FIG. 8 is a sequential diagram illustrating an operation of a conventional mobile communication system.

Referring to FIGS. 6 and 7, a mobile communication system according to Modification 3 of the invention is described. Hereinafter, a mobile communication system according to the Modification 3 is described by paying attention to a difference from the mobile communication system according to the first embodiment described above.

As shown in FIG. 6, an operation of the mobile communication system according to the Modification 3 is same as that of the mobile communication system according to the first embodiment of the invention shown in FIG. 2, except the operations in Steps S1130, S1170 and S117*e*.

Here, at Step S1130, the MME may store information indicating that it has transmitted a "Handover Command" at Step S113.

At Step S1170, the MME stores predetermined information indicating that it has received a "PS to CS Complete" at Step S117*d*, i.e., predetermined information indicating that switching of a radio access network in a connection destination in the UE#1 has been performed.

As shown in FIG. 7, when Step S1170 completes, the MME transmits a "Delete Bearer Command" to the S-GW at Step S501.

At Step S202, the S-GW transmits the "Delete Bearer Command" to the P-GW, and at Step S503, a "PCEF Initiated IP-CAN Session Modification" is performed between the P-GW and the PCRF, and at Step S504, the P-GW transmits a "Delete Bearer Request" to the S-GW.

At Step S505, the S-GW transmits the "Delete Bearer Request" to the MME.

Here, at Step S506, if the MME stores the predetermined information mentioned above (see Step S1170) when receiving the "Delete Bearer Request", at Step S507, the MME transmits to the S-GW a "Delete Bearer Response" indicating that deletion of the target bearer (the voice communication packet bearer mentioned above) has completed successfully, without instructing the UE#1 to release the voice communication packet bearer (specifically, without transmitting to the eNB a "Deactivate Bearer Request" containing a "NAS Deactivate EPS Bearer Context Request message".

Specifically, at Step S506, if the MME stores the predetermined information (see Step S1170) when receiving the "Delete Bearer Request", the processing of "steps 4 to 7 in Fig. 5.4.4.1-1 of 3GPP TS23.401" described above is not performed.

In contrast, at Step S405, when the MME detects that that the core bearer disconnection flag is not set in the received "Delete Bearer Request", as with the conventional case, the processing of "steps 4 to 7 in Fig. 5.4.4.1-1 of 3GPP TS23.401" described above is performed.

Note that when the MME receives the "Delete Bearer Request" at Step S505, it may or may not delete the voice communication packet bearer.

At Step S508, the S-GW transmits to the P-GW a "Delete Bearer Response" indicating that deletion of the target bearer (the voice communication packet bearer described above) has completed successfully.

Note that in the mobile communication system according to the Modification 3, PMIP may be used between the S-GW and the P-GW.

(Modification 4)

Note that the mobile communication systems according to the first embodiment and the Modifications 1 to 3 described above may be configured so that an UE#1 can be switched from a state of performing voice communications using a voice communication packet bearer via E-UTRAN and a mobile transmission network to a state of performing voice communications using a circuit-switched bearer via UTRAN/

GERAN and a core network, by using a "SRVCC improved scheme" specified in "3GPP TS23.237", instead of "SRVCC".

In addition, the mobile communication system according to the first embodiment and the Modifications 1 to 3 described above may be configured to switch from a state of performing voice communications using a voice communication packet bearer in a PS domain (state of performing VoIP communications in HSPA by using an IMS) to a state of performing voice communications using a circuit-switched bearer in a CS domain, by using "SRVCC" or "SRVCC improved scheme".

In such a case, it is assumed that the SGSN is provided with functions equivalent to the MME in the mobile communication systems according to the first embodiment and the Modifications 1 to 3 described above.

In addition, the invention can also apply to a case in which the above-mentioned "SRVCC" or "SRVCC improved scheme" is not used.

Specifically, the MME or the SGSN may be configured to delete only a predetermined packet bearer in a mobile transmission network by transmitting a "Delete Bearer Command" containing bearer disconnection information, and not to give an instruction to E-UTRAN or UTRAN/GERAN to release the predetermined packet bearer.

The features of the embodiment described above may also be expressed as follows:

A first feature of the embodiment is a mobile communication method for switching a UE#1 (a mobile station) from a state of performing voice communications using a voice communication packet bearer via E-UTRAN (a radio access network in a first communication scheme which does not support a circuit-switched communication) and a mobile transmission network accommodating the E-UTRAN to a state of performing voice communications using a circuit-switched bearer via UTRAN/GERAN (a radio access network in a second communication scheme which supports a circuit-switched communication) and a core network accommodating the UTRAN/GERAN, the method including the steps of: causing the UE#1 to switch a radio access network in a connection destination from the E-UTRAN to the UTRAN/GERAN; causing an MME (a mobility management node in a mobile transmission node) to receive a "Delete Bearer Request (delete bearer request signal)" for the voice communication packet bearer from an S-GW (a serving gateway apparatus in the mobile transmission node); and causing the MME to transmit to the S-GW a "Delete Bearer Response (delete bearer response signal)" to the "Delete Bearer Request", without giving an instruction to the UE#1 or the E-UTRAN to release the voice communication packet bearer, if a core bearer disconnection flag (a predetermined flag) is set in the received "Delete Bearer Request".

A second feature of the embodiment is a mobile communication method for switching a UE#1 from a state of performing voice communications using a voice communication packet bearer via E-UTRAN and a mobile transmission network accommodating the E-UTRAN to a state of performing voice communications using a circuit-switched bearer via UTRAN/GERAN and a core network accommodating the UTRAN/GERAN, the method including the steps of: causing the UE#1 to switch a radio access network in a connection destination from the E-UTRAN to the UTRAN/GERAN; causing an S-GW to receive a "Delete Bearer Request (a delete bearer request signal)" to the voice communication packet bearer, from a P-GW (a packet data network gateway apparatus in a mobile transmission node); and causing the S-GW to transmit to the P-GW a "Delete Bearer Response (a delete bearer response signal)" to the "Delete Bearer Request", without transmitting to an MME the "Delete Bearer Request" to the voice communication packet bearer, if a core bearer disconnection flag is set in the received "Delete Bearer Request".

A third feature of the embodiment is a mobile communication method for switching a UE#1 from a state of performing voice communications using a voice communication packet bearer via E-UTRAN and a mobile transmission network accommodating the E-UTRAN to a state of performing voice communications using a circuit-switched bearer via UTRAN/GERAN and a core network accommodating the UTRAN/GERAN, the method including the steps of: causing the UE#1 to switch a radio access network in a connection destination from the E-UTRAN to the UTRAN/GERAN; causing an S-GW to receive a "Diameter CC Answer (a delete bearer request signal)" to the voice communication packet bearer, from a PCRF (a policy controller in the mobile transmission node); and causing the S-GW not to transmit to an MME a "Delete Bearer Request" to the voice communication packet bearer, if a core bearer disconnection flag is set in the received "Diameter CC Answer".

A fourth feature of the embodiment is a mobile communication method for switching a UE#1 from a state of performing voice communications using a voice communication packet bearer via E-UTRAN and a mobile transmission network accommodating the E-UTRAN to a state of performing voice communications using a circuit-switched bearer via a UTRAN/GERAN and a core network accommodating the UTRAN/GERAN, the method including the steps of: causing the UE#1 to switch a radio access network in a connection destination from the E-UTRAN to the UTRAN/GERAN; causing an MME to store predetermined information indicating that switching of the radio access network in the connection destination in the UE#1 has been performed; causing the MME to receive a "Delete Bearer Request" to the voice communication packet bearer, from an S-GW; and causing the MME to transmit to the S-GW a "Delete Bearer Response" to the "Delete Bearer Request", without giving an instruction to the UE#1 or the E-UTRAN to release the voice communication packet bearer, if the MME stores the predetermined information.

A five feature of the embodiment is a mobile communication method for switching a UE#1 from a state of performing voice communications using a voice communication packet bearer in a PS (packet switched) domain to a state of performing voice communications using a circuit-switched bearer in a CS (circuit switched) domain, the method including the steps of: causing the UE#1 to switch a domain for performing voice communications from the PS domain to the CS domain; causing an SGSN (a packet switch in the packet switched domain) to receive a "Delete Bearer Request" to the voice communication packet bearer from an S-GW (a serving gateway apparatus in the packet switched domain); and causing the SGSN to transmit to the S-GW a "Delete Bearer Response" to the "Delete Bearer Request", without giving an instruction to the UE#1 to release the voice communication packet bearer, if a core bearer disconnection flag is set in the received "Delete Bearer Request".

A sixth feature of the embodiment is a mobile communication method for switching a UE#1 from a state of performing voice communications using a voice communication packet bearer in a PS domain to a state of performing voice communications using a circuit-switched bearer in a CS domain, the method including the steps of: causing the UE#1 to switch a domain for performing voice communications from the PS domain to the CS domain; causing an S-GW to receive a "Delete Bearer Request" to the voice communication packet bearer from a P-GW; and causing the S-GW to transmit to the P-GW a "Delete Bearer Response" to the "Delete Bearer Request", without transmitting to the SGSN a "Delete Bearer Request" to the voice communication packet bearer, if a core bearer disconnection flag is set in the received "Delete Bearer Request".

A seventh feature of the embodiment is a mobile communication method for switching a UE#1 from a state of performing voice communications using a voice communication packet bearer in a PS domain to a state of performing voice communications using a circuit-switched bearer in a CS domain, the method including the steps of: causing the UE#1 to switch a domain for performing voice communications from the PS domain to the CS domain; causing an S-GW to receive a "Diameter CC Answer" to the voice communication packet bearer from a PCRF; and causing the S-GW not to transmit to a SGSN a "Delete Bearer Request" to the voice communication packet bearer, if a core bearer disconnection flag is set in the received "Diameter CC Answer".

An eighth feature of the embodiment is a mobile communication method for switching a UE#1 from a state of performing voice communications using a voice communication packet bearer in a PS domain to a state of performing voice communications using a circuit-switched bearer in a CS domain, the method including the steps of: causing the UE#1 to switch a domain for performing voice communications from the PS domain to the CS domain; causing a SGSN to store predetermined information indicating that switching of the domain for performing the voice communications in the UE#1 has been performed; causing the SGSN to receive a "Delete Bearer Request" to the voice communication packet bearer from an S-GW; and causing the SGSN to transmit to the S-GW a "Delete Bearer Response" to the "Delete Bearer Request", without giving an instruction to the UE#1 to release the voice communication packet bearer, if the SGSN stores the predetermined information.

A ninth feature of the embodiment is an MME provided in a mobile communication system configured so that a UE#1 can be switched from a state of performing voice communications using a voice communication packet bearer via E-UTRAN and a mobile transmission network accommodating the E-UTRAN to a state of performing voice communications using a circuit-switched bearer via UTRAN/GERAN and a core network accommodating the UTRAN/GERAN, in which the MME is configured to receive a "Delete Bearer Request" to the voice communication packet bearer from an S-GW after the UE#1 switches a radio access network in a connection destination from the E-UTRAN to the UTRAN/GERAN, and the MME is configured to transmit to the S-GW a "Delete Bearer Response" to the "Delete Bearer Request", without giving an instruction to the UE#1 or the E-UTRAN to release the voice communication packet bearer, if a core bearer disconnection flag is set in the received "Delete Bearer Request".

A tenth feature of the embodiment is an S-GW provided in a mobile transmission node in a mobile communication system configured so that a UE#1 can be switched from a state of performing voice communications using a voice communication packet bearer via E-UTRAN and a mobile transmission network accommodating the E-UTRAN to a state of performing voice communications using a circuit-switched bearer via UTRAN/GERAN and a core network accommodating the UTRAN/GERAN, in which the S-GW is configured to receive a "Delete Bearer Request" to the voice communication packet bearer from a P-GW after the UE#1 switches a radio access network in a connection destination from the E-TRAN to the UTRAN/GERAN, and the S-GW is configured to transmit to the P-GW a "Delete Bearer Response" to the "Delete Bearer Request", without transmitting to an MME a "Delete Bearer Request" to the voice communication packet bearer, if a core bearer disconnection flag is set in the received "Delete Bearer Request".

An eleventh feature of the embodiment is an S-GW provided in a mobile communication system configured so that a UE#1 can be switched from a state of performing voice communications using a voice communication packet bearer via E-UTRAN and a mobile transmission network accommodating the E-UTRAN to a state of performing voice communications using a circuit-switched bearer via UTRAN/GERAN and a core network accommodating the UTRAN/GERAN, in which the S-GW is configured to receive a "Diameter CC Answer" to the voice communication packet bearer from a PCRF after the UE#1 switches a radio access network in a connection destination from the E-UTRAN to the UTRAN/GERAN, and the S-GW is configured not to transmit to an MME a "Delete Bearer Request" to the voice communication packet bearer, if a core bearer disconnection flag is set in the received "Diameter CC Answer".

A twelfth feature of the embodiment is a P-GW provided in a mobile communication system configured so that a UE#1 can be switched from a state of performing voice communications using a voice communication packet bearer via E-UTRAN and a mobile transmission network accommodating the E-UTRAN to a state of performing voice communications using a circuit-switched bearer via a UTRAN/GERAN and a core network accommodating the UTRAN/GERAN, in which the P-GW is configured to set a core bearer disconnection flag in a "Delete Bearer Request" to the voice communication packet bearer and to transmit it to an MME after the UE#1 switches a radio access network in a connection destination from the E-UTRAN to the UTRAN/GERAN.

A thirteenth feature of the embodiment is a PCRF in a mobile communication system configured so that a UE#1 can be switched from a state of performing voice communications using a voice communication packet bearer via E-UTRAN and a mobile transmission network accommodating the E-UTRAN to a state of performing voice communications using a circuit-switched bearer via UTRAN/GERAN and a core network accommodating the UTRAN/GERAN, in which the PCRF is configured to set a core bearer disconnection flag in a "Diameter CC Answer" and to the voice communication packet bearer to transmit it to an MME, after the UE#1 switches a radio access network in a connection destination from the E-UTRAN to the UTRAN/GERAN.

A fourteenth feature of the embodiment is an MME provided in a mobile communication system configured so that a UE#1 can be switched from a state of performing voice communications using a voice communication packet bearer via a E-UTRAN and a mobile transmission network accommodating the E-UTRAN to a state of performing voice communications using a circuit-switched bearer via a UTRAN/GERAN and a core network accommodating the UTRAN/GERAN, in which the MME is configured to store predetermined information indicating that switching of a radio access network in a connection destination in the UE#1 has been performed, after the UE#1 switches the radio access network in the connection destination from the E-UTRAN to the UTRAN/GERAN, and the MME configured to transmit to the S-GW a "Delete Bearer Response" to the "Delete Bearer Request", without giving an instruction to the UE#1 or the E-UTRAN to release the voice communication packet bearer, if the MME stores the predetermined information when receiving a "Delete Bearer Request" to the voice communication packet bearer from the S-GW.

A fifteenth feature of the embodiment is a SGSN provided in a mobile communication system configured so that a UE#1 can be switched from a state of performing voice communications using a voice communication packet bearer in a PS domain to a state of performing voice communications using a circuit-switched bearer in a CS domain, in which the SGSN is configured to receive a "Delete Bearer Request" to the voice communication packet bearer from an S-GW, after the UE#1 switches a domain for performing voice communications from the PS domain to the CS domain, and the SGSN is configured to transmit to the S-GW a "Delete Bearer Response" to the "Delete Bearer Request", without giving an instruction to the UE#1 to release the voice communication packet bearer, if a core bearer disconnection flag is set in the received "Delete Bearer Request".

A sixteenth feature of the embodiment is an S-GW provided in a mobile communication system configured so that a UE#1 can be switched from a state of performing voice communications using a voice communication packet bearer in a PS domain to a state of performing voice communications using a circuit-switched bearer in a CS domain, in which the S-GW is configured to receive a "Delete Bearer Request" to the voice communication packet bearer from a P-GW, after the UE#1 switches a domain for performing voice communications from the PS domain to the CS domain, and the S-GW is configured to transmit to the P-GW a "Delete Bearer Response" to the "Delete Bearer Request", without transmitting to a SGSN a "Delete Bearer Request" to the voice communication packet bearer, if a core bearer disconnection flag is set in the received "Delete Bearer Request".

A seventeenth feature of the embodiment is an S-GW provided in a mobile communication system configured so that a UE#1 can be switched from a state of performing voice communications using a voice communication packet bearer in a PS domain to state of performing voice communications using a circuit-switched bearer in a CS domain, in which the S-GW is configured to receive a "Diameter CC Answer" to the voice communication packet bearer from a PCRF after the UE#1 switches a domain for performing voice communications from the PS domain to the CS domain, and the S-GW is configured not to transmit to a SGSN a "Delete Bearer Request" to the voice communication packet bearer, if a core bearer disconnection flag is set in the received "Diameter CC Answer".

An eighteenth feature of the embodiment is a P-GW provided in a mobile communication system configured so that a UE#1 can be switched from a state of performing voice communications using a voice communication packet bearer in a PS domain to a state of performing voice communications using a circuit-switched bearer in a CS domain, in which the P-GW is configured to set a core bearer disconnection flag to a "Delete Bearer Request" to the voice communication packet bearer and to transmit it to a SGSN, after the UE#1 switches a domain for performing voice communications from the PS domain to the CS domain.

A nineteenth feature of the embodiment is a PCRF provided in a mobile communication system configured so that a UE#1 can be switched from a state of performing voice communications using a voice communication packet bearer in the PS domain to a state of performing voice communications using a circuit-switched bearer in a CS domain, in which the PCRF is configured to set a core bearer disconnection flag in a "Diameter CC Answer" to the voice communication packet bearer and to transmit it to a SGSN, after the UE#1 switches a domain for performing voice communications from the PS domain to the CS domain.

A twentieth feature of the embodiment is a SGSN provided in a mobile communication system configured so that a UE#1 can be switched from a state of performing voice communications using a voice communication packet bearer in a PS domain to a state of performing voice communications using a circuit-switched bearer in a CS domain, in which the SGSN is configured to store predetermined information indicating that switching of a domain for performing voice communications in the UE#1 has been performed, after the UE#1 switches the domain for performing voice communications from the PS domain to the CS domain, and the SGSN is configured to transmit to an S-GW a "Delete Bearer Response" to the "Delete Bearer Request", without giving an instruction to the UE#1 to release the voice communication packet bearer, if the SGSN stores the predetermined information when receiving a "Delete Bearer Request" to the voice communication packet bearer from the S-GW.

A twenty-first feature of the embodiment is an MME configured to transmit to a mobile transmission network a "Delete Bearer Command (delete bearer instruction signal)" to a predetermined packet bearer, and not to give an instruction to a UE#1 or E-UTRAN to release the predetermined packet bearer, if a core bearer disconnection flag is set in a received "Delete Bearer Request" signal to the predetermined packet bearer.

A twenty-second feature of the embodiment is a SGSN configured to transmit to a core network a "Delete Bearer Command" to a predetermined packet bearer, and not to give an instruction to a UE#1 or UTRAN/GERAN to release the predetermined packet bearer, if a core bearer disconnection flag is set in a received "Delete Bearer Request" to the predetermined packet bearer.

Note that the operations of the UE#1, UE#2, UTRAN/GERAN, MSC, MSC server, CS-MGW, SGSN, E-UTRAN (eNB), MME, S-GW, P-GW, P-CSCF, I/S-CSCF, SCC AS, PCRF may be implemented by hardware or may be implemented by a software module executed by a processor, or may be implemented by the combination thereof.

The software module may be provided in any form of recording medium such as a RAM (Random Access Memory), flash memory, ROM (Read Only Memory), EPROM (Erasable Programmable ROM), EEPROM (Electronically Erasable and Programmable ROM), register, hard disk, removable disk, or CD-ROM.

Such recording medium is connected to the processor so that the processor can read or write information on the medium. In addition, the recording medium may be integrated into the processor. Also, the recording medium and the processor may be provided inside ASIC. Such ASIC may be provided in the UE#1, UE#2, UTRAN/GERAN, MSC, MSC server, CS-MGW, SGSN, E-UTRAN (eNB), MME, S-GW, P-GW, P-CSCF, I/S-CSCF, SCC AS, or PCRF. In addition, the recording medium and the processor may be provided as a discrete component in the UE#1, UE#2, UTRAN/GERAN, MSC, MSC server, CS-MGW, SGSN, E-UTRAN (eNB), MME, S-GW, P-GW, P-CSCF, I/S-CSCF, SCC AS, or PCRF.

As described above, the present invention has been described in detail using the above embodiments. It is apparent for those who are in the art that the invention is not limited to the embodiments described herein. The invention can be implemented as modifications and amendments without departing from the spirit and scope of the invention, which is defined by the description of the scope of claims. Accordingly, the description is intended to illustratively describe the invention and is not intended to limit the invention.

The invention claimed is:

1. A mobile communication method for switching a mobile station from a state of performing voice communications using a voice communication packet bearer via a radio access network in a first communication scheme which does not support a circuit-switched communication and a mobile transmission network accommodating the radio access network in the first communication scheme to a state of performing voice communications using a circuit-switched bearer via a radio access network in a second communication scheme which supports the circuit-switched communication and a core network accommodating the radio access network in the second communication scheme, the mobile communication method comprising the steps of:
   causing the mobile station to switch a radio access network in a connection destination from the radio access network in the first communication scheme to the radio access network in the second communication scheme;
   causing a mobility management node in the mobile transmission network to store predetermined information indicating that switching of the radio access network in the connection destination in the mobile station has been performed;
   causing the mobility management node to receive a delete bearer request signal to the voice communication packet bearer from a serving gateway apparatus in the mobile transmission network; and
   causing the mobility management node to transmit to the serving gateway apparatus a delete bearer response signal to the delete bearer request signal, without giving an instruction to the mobile station or the radio access network in the first communication scheme to release the voice communication packet bearer, if the mobility management node stores the predetermined information.

2. A mobile communication method for switching a mobile station from a state of performing voice communications using a voice communication packet bearer in a packet switched domain to a state of performing voice communications using a circuit-switched bearer in a circuit switched domain, the mobile communication method comprising the steps of:
   causing the mobile station to switch a domain for performing voice communications from the packet switched domain to the circuit switched domain;
   causing a packet switch in the packet switched domain to store predetermined information indicating that switching of the domain for performing voice communications in the mobile station has been performed;
   causing the packet switch to receive a delete bearer request signal to the voice communication packet bearer from a serving gateway apparatus in the packet switched domain; and
   causing the packet switch to transmit to the serving gateway apparatus a delete bearer response signal to the delete bearer request signal, without giving an instruction to the mobile station to release the voice communication packet bearer, if the packet switch stores the predetermined information.

3. A mobility management node provided in a mobile transmission network, in a mobile communication system configured so that a mobile station can be switched from a state of performing voice communications using a voice communication packet bearer via a radio access network in a first communication scheme which does not support a circuit-switched communication and the mobile transmission network accommodating the radio access network in the first communication scheme to a state of performing voice communications using a circuit-switched bearer via a radio access network in a second communication scheme which supports the circuit-switched communication and a core network accommodating the radio access network in the second communication scheme, wherein
   the mobility management node is configured to store predetermined information indicating that switching of a radio access network in a connection destination in the mobile station has been performed, after the mobile station switches the radio access network in the connection destination from the radio access network in the first communication scheme to the radio access network in the second communication scheme, and
   the mobility management node is configured to transmit to a serving gateway apparatus a delete bearer response signal to a delete bearer request signal, without giving an instruction to the mobile station or the radio access network in the first communication scheme to release the voice communication packet bearer, if the mobility management node stores the predetermined information when receiving the delete bearer request signal to the voice communication packet bearer from the serving gateway apparatus in the mobile transmission network.

4. A packet switch provided in a packet switched domain, in a mobile communication system configured so that a mobile station can be switched from a state of performing voice communications using a voice communication packet bearer in the packet switched domain to a state of performing voice communications using a circuit-switched bearer in a circuit switched domain, wherein
   the packet switch is configured to store predetermined information indicating that switching of a domain for performing voice communications in the mobile station has been performed, after the mobile station switches the domain for performing voice communications from the packet switched domain to the circuit switched domain, and
   the packet switch is configured to transmit to a serving gateway apparatus a delete bearer response signal to a delete bearer request signal, without giving an instruction to the mobile station to release the voice communication packet bearer, if the packet switch stores the predetermined information when receiving the delete bearer request signal to the voice communication packet bearer from the serving gateway apparatus in the packet switched domain.

* * * * *